(12) United States Patent
Prentice et al.

(10) Patent No.: US 10,408,083 B2
(45) Date of Patent: Sep. 10, 2019

(54) HOLLOW METAL OBJECTS AND METHODS FOR MAKING SAME

(71) Applicant: General Electric Company, Schenectady, NY (US)

(72) Inventors: Ian Francis Prentice, Cincinnati, OH (US); Eric Allen Ott, Cincinnati, OH (US); Andrew Philip Woodfield, Maineville, OH (US)

(73) Assignee: General Electric Company, Schenectady, NY (US)

( * ) Notice: Subject to any disclaimer, the term of this patent is extended or adjusted under 35 U.S.C. 154(b) by 417 days.

(21) Appl. No.: 14/895,976

(22) PCT Filed: Jun. 6, 2014

(86) PCT No.: PCT/US2014/041290
§ 371 (c)(1),
(2) Date: Dec. 4, 2015

(87) PCT Pub. No.: WO2014/197789
PCT Pub. Date: Dec. 11, 2014

(65) Prior Publication Data
US 2016/0115820 A1    Apr. 28, 2016

Related U.S. Application Data

(60) Provisional application No. 61/832,439, filed on Jun. 7, 2013.

(51) Int. Cl.
*F01D 25/00*    (2006.01)
*F01D 9/02*    (2006.01)
(Continued)

(52) U.S. Cl.
CPC .............. *F01D 25/005* (2013.01); *B05D 1/02* (2013.01); *B22C 9/108* (2013.01); *B22D 23/003* (2013.01);
(Continued)

(58) Field of Classification Search
CPC . F01D 25/005; F01D 9/02; F01D 5/18; B22D 23/00; B22D 23/003; B22D 29/001;
(Continued)

(56) References Cited

U.S. PATENT DOCUMENTS 2,641,439 A * 6/1953 Williams ................ F01D 5/187
205/180
3,848,307 A * 11/1974 Kydd ...................... B23P 15/04
228/204

(Continued)

FOREIGN PATENT DOCUMENTS

CA    2 408 703 A1    11/2001
CN    1896463 A    1/2007
(Continued)

OTHER PUBLICATIONS

Unofficial English Translation of Chinese Office Action issued in connection with corresponding CN Application No. 201480032563.7 dated Nov. 30, 2016.
(Continued)

*Primary Examiner* — Jason D Shanske
*Assistant Examiner* — Jason G Davis
(74) *Attorney, Agent, or Firm* — Dority & Manning, P.A.

(57) ABSTRACT

A method of making a hollow metal component comprising the steps of providing at least one core comprising a first side and a reverse side; utilizing a first metal spray process to apply at least one metal or metal alloy to the first side of the core, resulting in a partially-formed structure comprising a first side and a reverse side; and utilizing a second metal
(Continued)

spray process to apply at least one metal or metal alloy to the reverse sides of the partially-formed structure and the core, resulting in a rough structure. A hollow metal component comprising a first side having interior and exterior surfaces, a reverse side having interior and exterior surfaces, the interior surfaces of the first side and the reverse side defining at least one cavity. The component is integrally formed and has regions comprising relatively different material compositions, the regions having gradual transitions of materials therebetween.

10 Claims, 6 Drawing Sheets

(51) Int. Cl.
*F01D 5/28* (2006.01)
*B05D 1/02* (2006.01)
*B22D 29/00* (2006.01)
*B22C 9/10* (2006.01)
*B22D 23/00* (2006.01)
*B22F 5/10* (2006.01)
*B22F 5/04* (2006.01)
*F01D 5/14* (2006.01)
*B22F 5/00* (2006.01)
*B22F 3/115* (2006.01)

(52) U.S. Cl.
CPC ............ *B22D 29/001* (2013.01); *B22F 5/009* (2013.01); *B22F 5/04* (2013.01); *B22F 5/10* (2013.01); *F01D 5/147* (2013.01); *F01D 5/288* (2013.01); *F01D 9/02* (2013.01); *B22F 3/115* (2013.01); *B22F 2005/103* (2013.01); *F05D 2220/36* (2013.01); *F05D 2230/22* (2013.01); *F05D 2230/31* (2013.01); *Y02T 50/672* (2013.01); *Y02T 50/673* (2013.01)

(58) Field of Classification Search
CPC .. B22F 5/009; B22F 5/04; B22F 3/115; B22F 2005/103; B22C 9/10; B22C 9/103
USPC .......................................................... 164/369
See application file for complete search history.

(56) References Cited

U.S. PATENT DOCUMENTS

| | | | |
|---|---|---|---|
| 4,447,466 A | 5/1984 | Jackson et al. | |
| 4,574,451 A * | 3/1986 | Smashey | B23P 15/04 164/132 |
| 7,316,057 B2 | 1/2008 | Seth | |
| 7,384,596 B2 | 6/2008 | Woodfield et al. | |
| 8,192,799 B2 * | 6/2012 | Kay | B05B 7/1486 427/189 |
| 2006/0222776 A1 * | 10/2006 | Madhava | C23C 2/04 427/446 |
| 2007/0003416 A1 | 1/2007 | Bewlay et al. | |
| 2008/0290215 A1 * | 11/2008 | Udall | F01D 5/147 244/123.14 |
| 2011/0192024 A1 | 8/2011 | Allen | |
| 2013/0104567 A1 | 5/2013 | Konitzer et al. | |

FOREIGN PATENT DOCUMENTS

| | | |
|---|---|---|
| CN | 101418706 A | 4/2009 |
| CN | 103089326 A | 5/2013 |
| EP | 0 077 476 A2 | 4/1983 |
| EP | 1903127 A1 | 3/2008 |
| EP | 1995411 A2 | 11/2008 |
| JP | S57-152459 A | 9/1982 |
| JP | H06-145945 A | 5/1994 |
| JP | H10-018911 A | 1/1998 |

OTHER PUBLICATIONS

International Search Report and Written Opinion issued in connection with corresponding PCT Application No. PCT/US2014/041290 dated Dec. 18, 2014.
Binshi, X., "Nano Surface Engineering," 15th national key books, pp. 1-3 (2004).
Machine Translation and Third Office Action and Search issued in connection with corresponding CN Application No. 201480032563.7 dated Feb. 2, 2018.
Office Action issued in connection with corresponding CA Application No. 2914530 dated Aug. 11, 2017.
Hussain, T., "Cold Spraying of Titanium: A Review of Bonding Mechanisms, Microstructure and Properties," Key Engineering Materials, vol. 533, pp. 53-90 (Dec. 27, 2012).
Office Action issued in connection with corresponding CA Application No. 2914530 dated Apr. 16, 2018.
Machine translation and Copy of Notification of Reasons for Refusal issued in connection with corresponding JP Application No. 2016-518030 dated Jul. 3, 2018.
Machine Translation and Copy of First Office Action and Search issued in connection with corresponding CN Application No. 201480032563.7 dated Sep. 4, 2018.

* cited by examiner

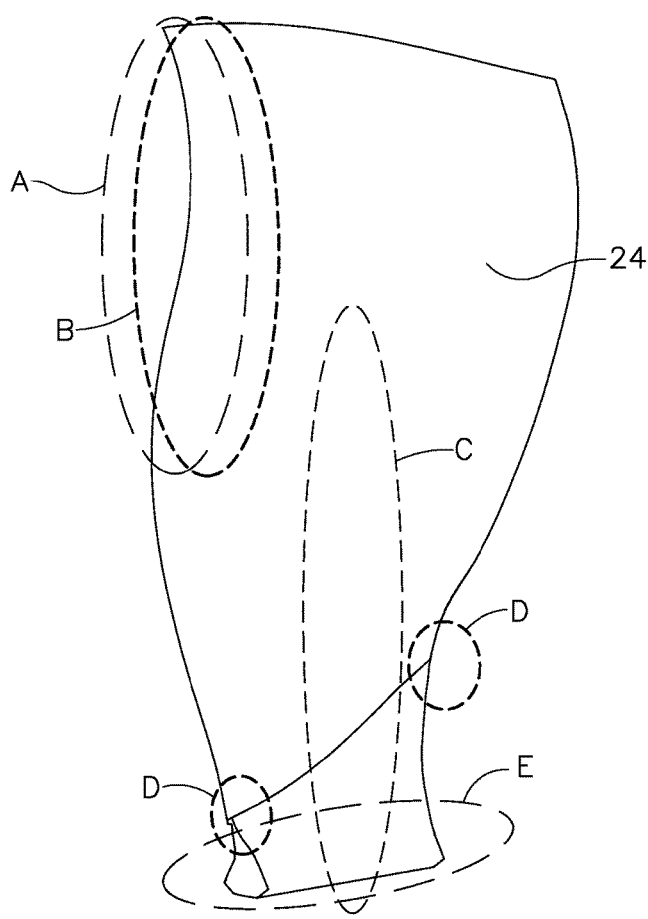
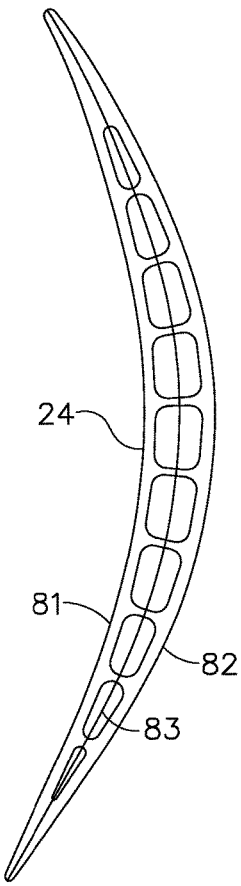
FIG. 2
PRIOR ART
FIG. 3
PRIOR ART
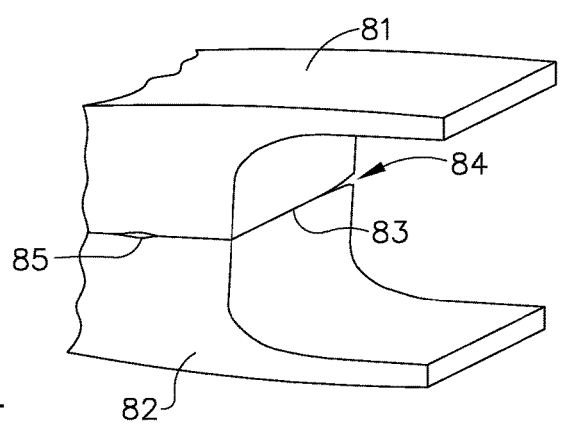
FIG. 4
PRIOR ART

HOLLOW METAL OBJECTS AND METHODS FOR MAKING SAME

CROSS-REFERENCE TO RELATED APPLICATIONS

This application is a national stage application under 35 U.S.C. § 371(c) of prior filed, co-pending PCT application serial number PCT/US2014/041290, filed on Jun. 6, 2014, which claims priority to U.S. Provisional Application Ser. No. 61/832,439, titled "HOLLOW METAL OBJECTS AND METHODS FOR MAKING SAME" filed Jun. 7, 2013. The above-listed applications are herein incorporated by reference.

BACKGROUND OF THE INVENTION

The technology described herein relates generally to methods for making hollow metal objects, and more particularly to such objects for use as airfoils for gas turbine engines.

Many gas turbine engine assemblies include hollow metal objects, such as airfoils in the form of fan blades, and/or non-rotating stationary airfoils, such as guide vanes. Hollow areas within the object may be utilized to reduce weight and/or impart other desirable structural properties.

Hollow metal structures with good properties and dimensional control are often difficult to manufacture and may be expensive due to processing complexity and low yield with conventional processes.

Hollow metal structures have been created by several methods. Casting is affordable, but thin wall sections can be difficult to control and material properties can be poor. Fabrication can be done multiple ways. The component parts can be cut and formed from sheet metal, cast, milled and/or 'Super Plastic Formed'. The bonding may be by fusion welding, solid state welding, diffusion bonding, activated diffusion bonding, brazing, bolting, or adhesive bonding. Welding creates local heat affected zones which may require subsequent heat treatment. Brazing and activated diffusion bonds may have local inferior property regions due to local alloying. Adhesive bonds may lack sufficient strength. Prolonged processing at elevated temperature can degrade material properties such as fatigue and ductility.

There remains a need for improved manufacturing methods for making hollow metal objects which are cost effective and yield structures with good physical properties and dimensional control.

BRIEF DESCRIPTION OF THE INVENTION

In one aspect, a method of making a hollow metal component comprising the steps of: providing at least one core comprising a first side and a reverse side; utilizing a first metal spray process to apply at least one metal or metal alloy to the first side of the core, resulting in a partially-formed structure comprising a first side and a reverse side; and utilizing a second metal spray process to apply at least one metal or metal alloy to the reverse sides of the partially-formed structure and the core, resulting in a rough structure.

In another aspect, a hollow metal component comprising a first side having interior and exterior surfaces, a reverse side having interior and exterior surfaces, the interior surfaces of the first side and the reverse side defining at least one cavity. The component is integrally formed and has regions comprising relatively different material compositions, the regions having gradual transitions of materials therebetween.

BRIEF DESCRIPTION OF THE DRAWINGS

FIG. 2 is an elevational view of an exemplary hollow metal object in the form of a prior art fan blade for a gas turbine engine;

FIG. 3 is a cross-sectional illustration of a prior art hollow metal object in the form of a fan blade;

FIG. 4 is an enlarged cross-sectional view of a diffusion bonded region of the prior art fan blade of FIG. 3.

DETAILED DESCRIPTION OF THE INVENTION

Figure 1:
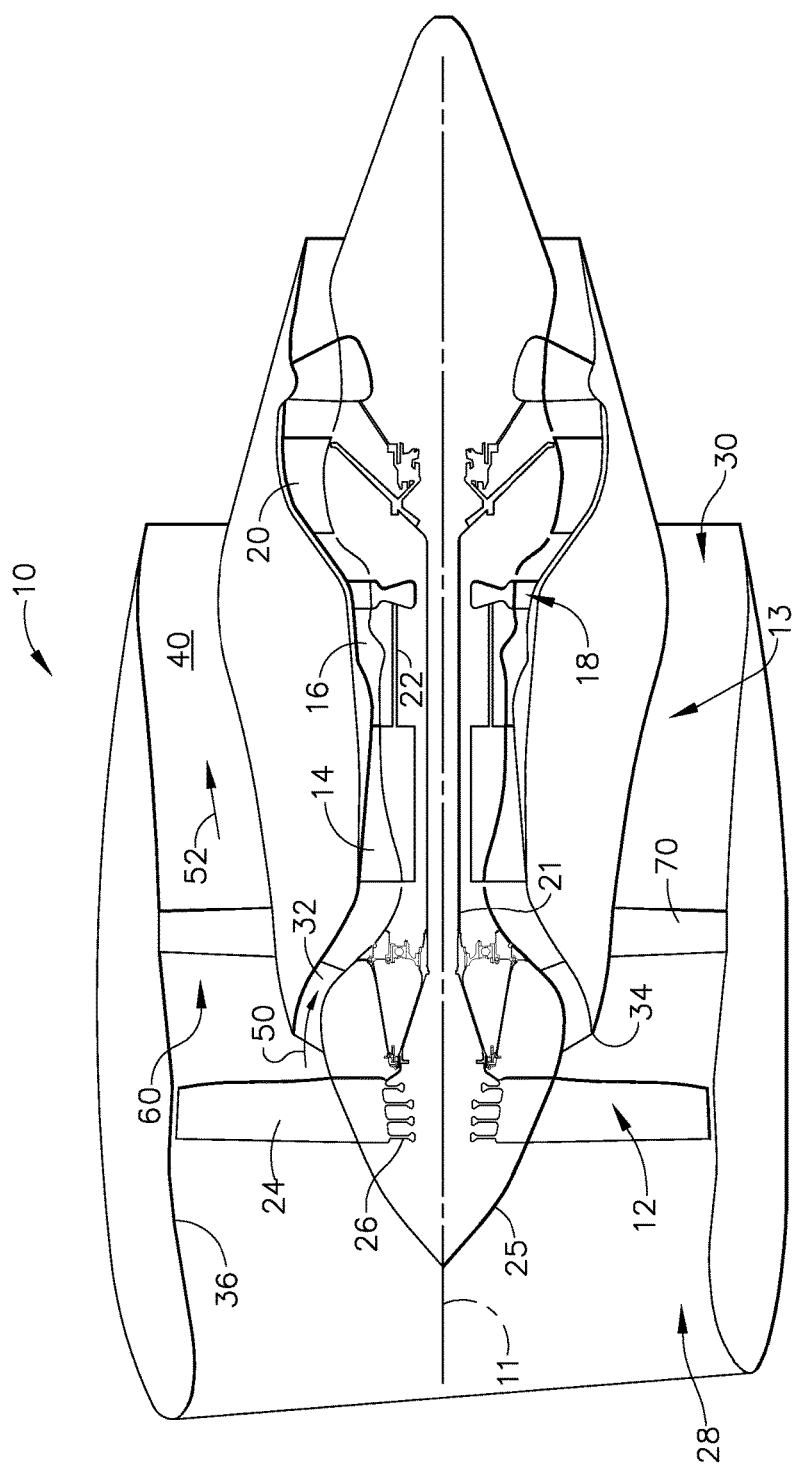
FIG. 1 is an elevational cross-sectional view of an exemplary gas turbine engine.

FIG. 1 is a cross-sectional schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster 32, and a splitter 34 that substantially circumscribes booster 32.

Fan assembly 12 includes an array of fan blades 24 extending radially outward from a rotor disk 26, the forward portion of which is enclosed by a streamlined spinner 25. Gas turbine engine assembly 10 has an intake side 28 and an exhaust side 30. Fan assembly 12, booster 32, and turbine 20 are coupled together by a first rotor shaft 21, and compressor 14 and turbine 18 are coupled together by a second rotor shaft 22.

In operation, air flows through fan assembly 12 and a first portion 50 of the airflow is channeled through booster 32. The compressed air that is discharged from booster 32 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 32 by way of shaft 21. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around core gas turbine engine 13. More specifically, bypass duct 40 extends between a fan casing or shroud 36 and splitter 34. Accordingly, a first portion 50 of the airflow from fan assembly 12 is channeled through booster 32 and then into compressor 14 as described above, and a second portion 52 of the airflow from fan assembly 12 is channeled through bypass duct 40 to provide thrust for an aircraft, for example. Splitter 34 divides the incoming airflow into first and second portions 50 and 52, respectively. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that extend substantially radially between a radially outer mounting flange and a radially inner mounting flange and are circumferentially-spaced within bypass duct 40. Fan frame assembly 60 may also include a plurality of struts that are coupled between a radially outer mounting flange and a radially inner mounting flange. In one embodiment, fan frame assembly 60 is fabricated in arcuate segments in which flanges are coupled to outlet guide vanes 70 and struts. In one embodiment, outlet guide vanes and struts are coupled coaxially within bypass duct 40. Optionally, outlet guide vanes 70 may be coupled downstream from struts within bypass duct 40.

Fan frame assembly 60 is one of various frame and support assemblies of gas turbine engine assembly 10 that are used to facilitate maintaining an orientation of various components within gas turbine engine assembly 10. More specifically, such frame and support assemblies interconnect stationary components and provide rotor bearing supports. Fan frame assembly 60 is coupled downstream from fan assembly 12 within bypass duct 40 such that outlet guide vanes 70 and struts are circumferentially-spaced around the outlet of fan assembly 12 and extend across the airflow path discharged from fan assembly 12.

Components of the fan assembly and the fan frame assembly, such as fan blades, metal leading edges of fan blades, outlet guide vanes, and struts are often substantially hollow in order to reduce weight and/or impart other desirable structural properties. However, such hollow components are often difficult and expensive to manufacture with conventional processes. Additionally, conventional processes may result in a component with undesirable features, such as thin walls; weak areas around bonds, welds, and brazes; thick walls due to manufacturing limitations; and components with insufficiently diverse material properties.

FIG. 2 illustrates a conventional hollow metal object in the form of fan blade 24 made by a conventional fabrication process, where the blade is formed in two halves which are then joined together by diffusion bonding to form hollow interior spaces. FIG. 3 is a cross-sectional illustration of fan blade 24 illustrating two halves, 81, 82 joined along a bond line 83. As the enlargement in FIG. 4 illustrates, there are opportunities for edge flaws such as shown at 84 and stress concentrations where the two halves join at the many contact surfaces, as well as the challenges with ensuring that the diffusion bonds are formed completely and correctly to avoid disband regions such as shown at 85.

As shown in FIG. 2, the fan blade 24 may have different regions where different properties are desired for performance and/or durability or other considerations. For example, region A on the outer leading edge may be desired to have high density and high modulus characteristics. Regions B on the outer leading edge and D in the platform region may be desired to have high strain to failure characteristics (such as 15% Elongation). Region C in the mid-chord region of the blade may be desired to have high modulus and low density characteristics. Region E in the vicinity of the blade root may be desired to have an optimized high cycle fatigue to low cycle fatigue (HCF/LCF) characteristics and weldability for configurations where it may be joined by welding to a disk to form a blisk.

Conventionally produced hollow fan blades such as fan blade 24 of FIGS. 2-4 are manufactured with honey-comb cores and brazed together, truss cores by super plastic forming and diffusion bonding (SPF-DB), and with rib cores by machining and diffusion bonding or welding. Blades with multiple material properties are conventionally made by bonding dissimilar materials together (MLE onto composite or aluminum blade)

Hollow blades such as fan blade 24 are typically expensive to produce using current conventional manufacturing methods. Metallic blades are generally limited to one material property over the whole blade. Bonded-on leading edges for composite or metallic blades are expensive to machine using conventional manufacturing methods and require secondary processes to attach to the airfoil.

The method of manufacturing hollow metal objects described below and depicted in FIGS. 5-12 may eliminate one or more material deficiencies of conventionally made hollow components, including, but not limited to, weak areas resulting from thin walls, brazing, welding, or bonding. Furthermore, articles manufactured by the methods described herein may be made of different materials in different regions, such that different regions comprise different material properties. Hollow components made in accordance with the methods described herein may therefore be tailored to have desired material properties in different regions. Included are hollow components with one or more of the aforementioned advantages as well as methods to create hollow components having one or more of the aforementioned advantages.

Metal spraying, generally, is an additive manufacturing process for building up layers of metal over a substrate. By changing the constituents of the feedstock (metallic powder), different regions of the sprayed area may be formed from different alloys. This may be advantageous for a component which could benefit from differing material properties in different regions, such as a fan blade 24 as depicted in FIG. 2. Additionally, non-traditional alloys may be created that are not normally available from a melt process.

In the metal spray process, generally, fine metallic powder particles are accelerated and impacted onto a substrate where they stick. Subsequent thermal and pressure treatments may ensure a 100% dense object with fine grain size. The chemical composition of the article is a reflection of the chemical composition of the feedstock (metallic powder). By changing the constituents of the feedstock (metallic powder), different regions of the sprayed area may be formed from different alloys, such as in the eight step process depicted in FIGS. 5-12. The powder may be made from pre-alloyed material, or from a mixture of different alloys. In the latter case, the metals become partially or fully alloyed during the subsequent thermal operations. This can result in alloys not producible by a melt process.

Components typically do not require the same material properties in all locations. In fact, it is desirable to have a component with different material properties in different regions of the component, such as described above with regard to regions A-E of fan blade 24. Either a compromise is employed resulting in unnecessary weight or thickness, or the part is fabricated from multiple pieces of different materials. The method described herein allows the material properties of a component to be tailored to meet the local requirements in each region of the component. The components described herein comprise regions comprised of different materials while still being substantially integrally formed.

In one embodiment, such as shown in FIGS. 5-12, a method utilizes metal spraying to spray metal onto a backing tool or forming tool and core(s) to create a hollow metal part. Another embodiment is the hollow metal part created from such a method. In one embodiment of the invention, a method comprises a first metal spray process, which sprays metal over a single core or multiple cores such that subsequently the cores may be mechanically, chemically, or thermally removed, such as by melting or pyrolizing, resulting in a hollow metal part. Alternatively, a core of light weight material may be left in place. The forming tool may comprise one or more pieces. The cores constitute an insert or separate piece of diverse materials, typically of lighter weight and of lower density than the material to be formed over it. The cores may be present merely to enable the formation of a hollow space in the finished part or to impart other desirable properties. The cores may be elongated tubes or strips, or they may have other more complex, geometrical shapes such as a grid or mesh. To form adjacent, non-cored regions, a backing tool or former may be used. Such a backing tool or former allows simultaneous buildup of a solid metal spray region adjacent to the cores, resulting in a partially-formed structure. More complex shapes may be completed by subsequently removing the part from the backing tool or former and performing a second metal spray process on the reverse side, resulting in a rough structure. Alternatively, adjacent non-cored regions may be built up directly on the core.

FIGS. 5-12 illustrate an eight-step process for forming a hollow metal object such as a fan blade using cores and a forming tool.

Figure 5:
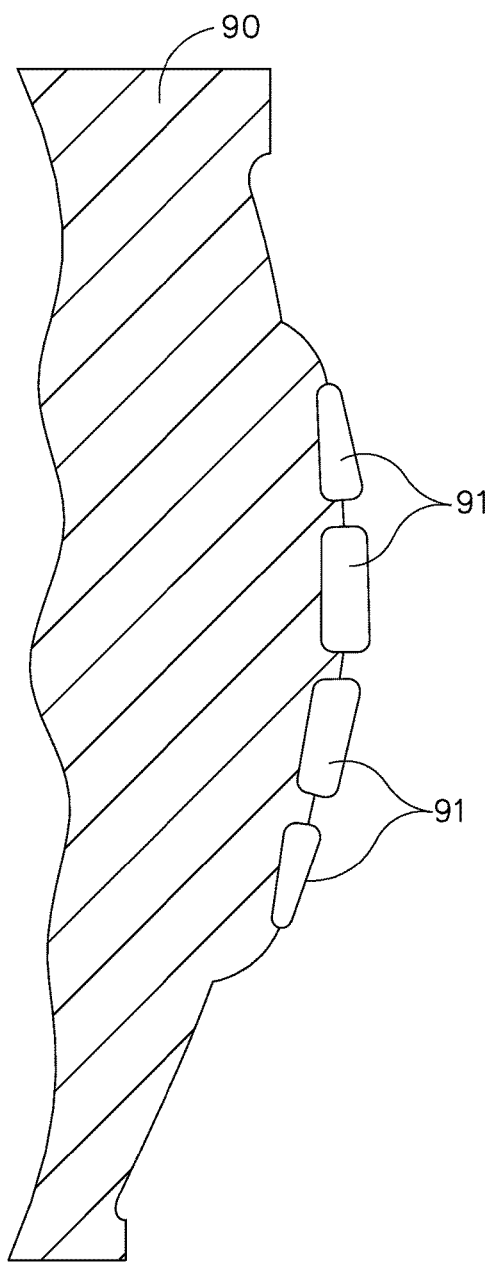
FIGS. 5-12 are cross-sectional illustrations of an exemplary hollow metal object at eight stages in the formation process.

In FIG. 5, a forming tool 90 is provided, of suitable size and shape for the desired article to be formed. One or more cores 91 may be provided, each having a first side and a reverse side, and their reverse sides are affixed to a surface of the forming tool 90, for creating hollow or light weight cavities in the finished object. In an alternative embodiment, one or more cores may be provided in the absence of a forming tool and material may be applied to opposing sides of the core(s) simultaneously or sequentially.

Figure 6:
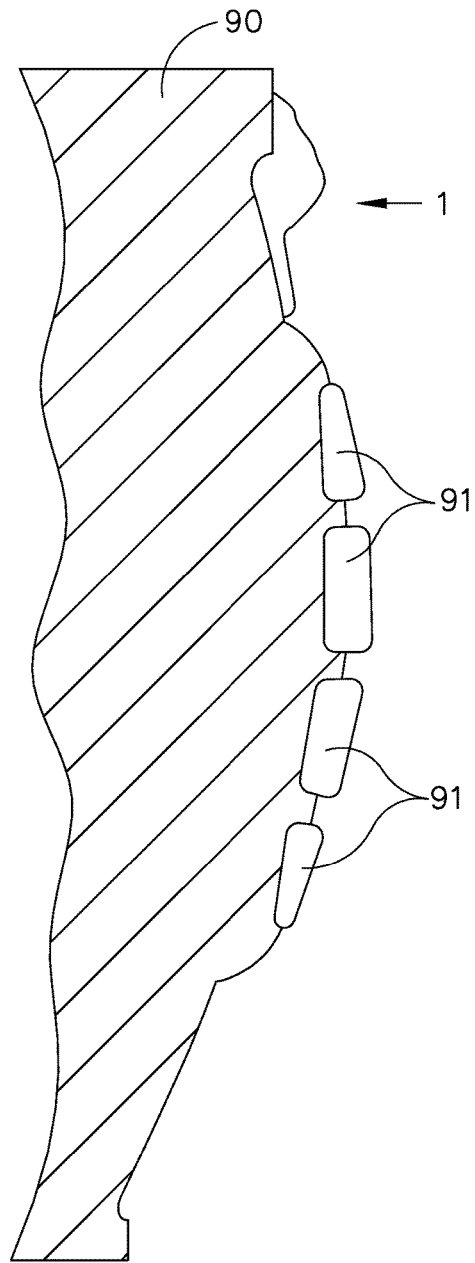
Figure 7:
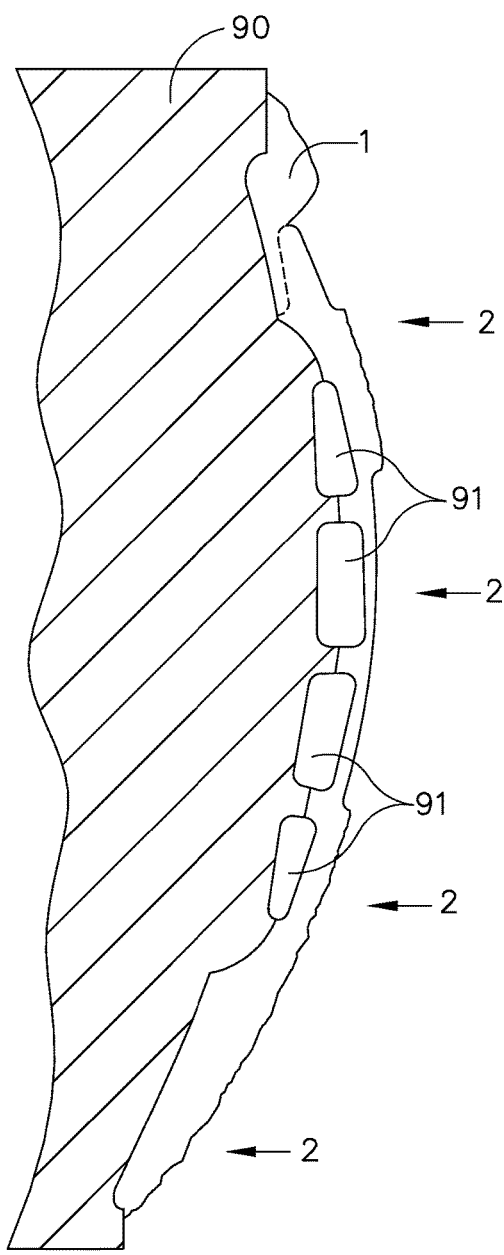

FIG. 6 shows the tool 90 and cores 91 of FIG. 5, and a material 1 has been deposited on a desired region of the tool 90. FIG. 7 then depicts a further step of depositing a material 2 on a desired region of the tool 90 and cores 91. Material 2 may be the same as, or different from, material 1, such that different regions of the finished object may be formed of diverse materials with diverse properties. If materials 1 and 2 are the same and/or only one material is involved, the steps of FIGS. 6 and 7 can be combined and/or one can be omitted.

Figure 8:
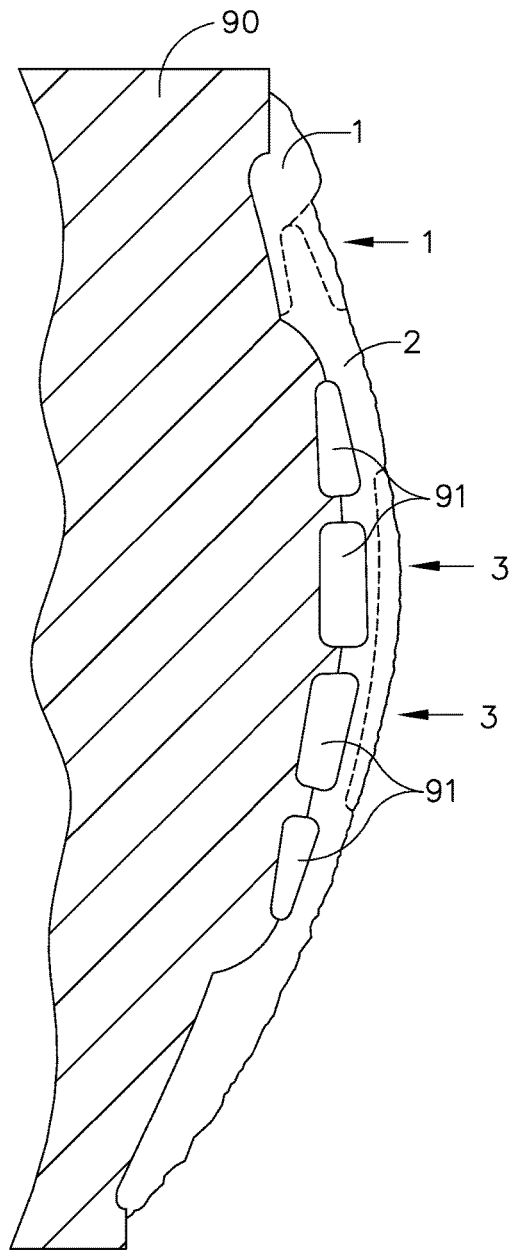

FIG. 8 depicts a further step of depositing an additional quantity of material 1 over a portion of material 2 in the vicinity of the first deposition of material 1, such that material 1 surrounds the end of the material 2 deposition, and the deposition of a third material 3 in a central region over material 2. Greater or fewer numbers of different materials may be applied in the same manner.

Appropriate set-up, dwell, or residence time may be employed between any or all steps in the method of FIGS. 5-12. Additional intermediate processing steps such as thermal or chemical treatment or mechanical (for example, machining or peening) operations may be performed.

Figure 9:
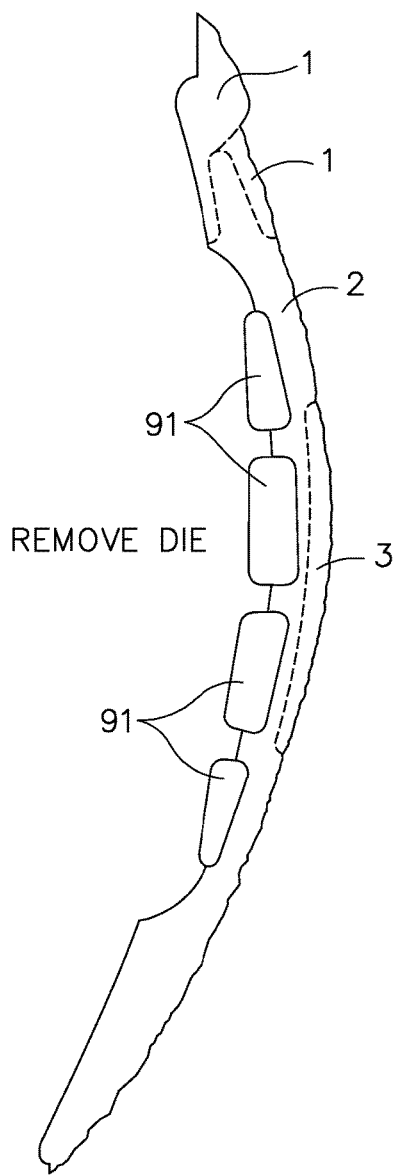
Figure 10:
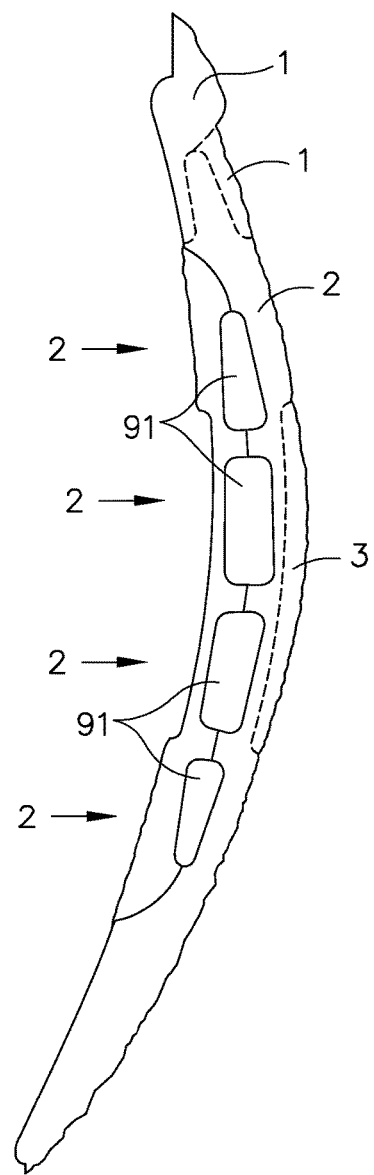
Figure 11:
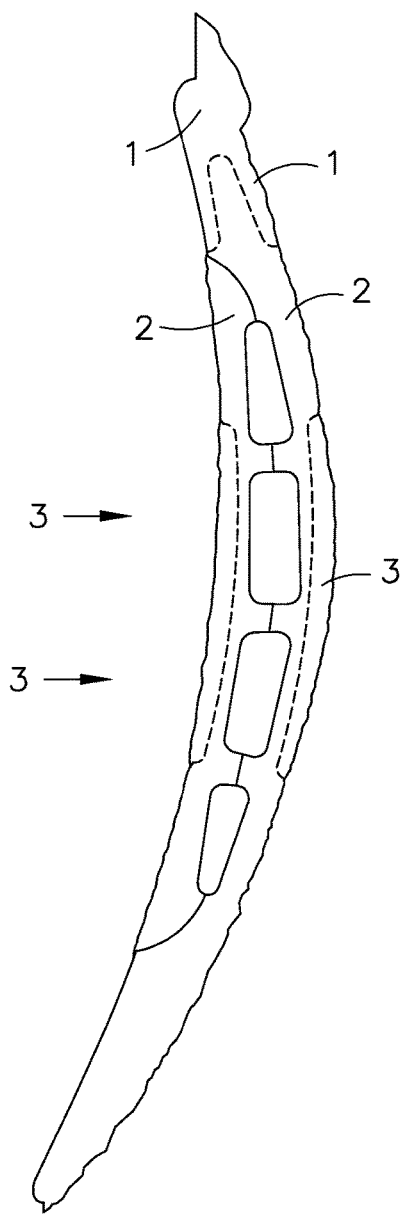

After the step depicted in FIG. 8, the forming tool is then removed as shown in FIG. 9 to expose the reverse dies of the core(s) 91 and the partially formed structure comprising the previously deposited materials (1, 2, and 3, as applicable). As shown in FIG. 10, an additional quantity of material 2 is then applied over the reverse side of the core(s) 91 and the partially formed structure, such that the cores are surrounded by and encased within opposing layers of material 2. FIG. 11 illustrates the application of material 3 in a central region of the partially formed structure. This completes the application process of material such as metal or metal alloys over and surrounding cores.

Depending upon the configuration of the intended component and/or of the cores employed, the steps of applying the metal spray may be accomplished continuously thereby resulting in a process where spray application steps are accomplished in a single combined step rather than discretely with first and second steps each having a start and an end.

Figure 12:
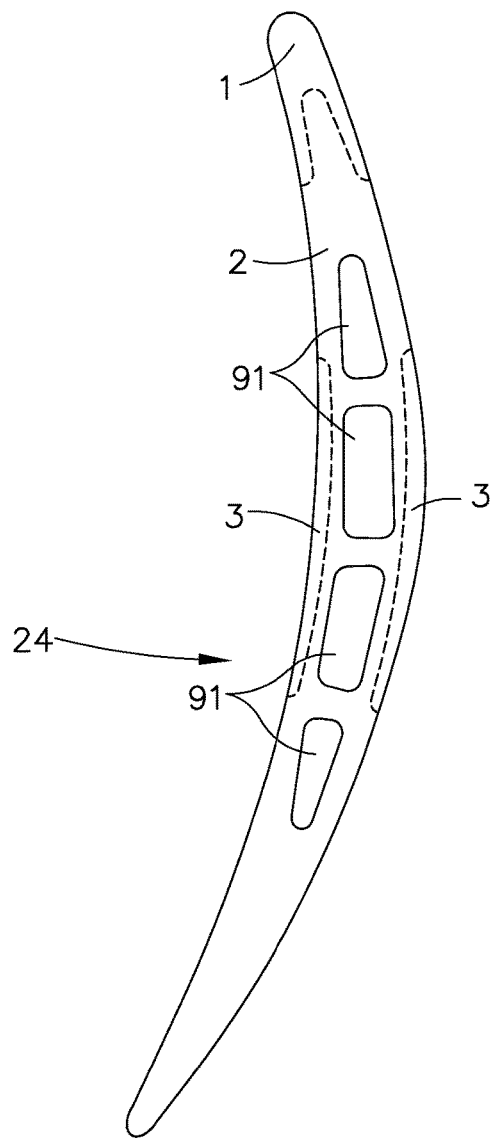

FIG. 12 illustrates a finished hollow metal object, such as a fan blade 24, after optional steps of densification and finish machining. Suitable coatings may also be applied on all or part of the finished object as desired for the intended application. In many cases, machining and/or polishing may be required after densification, but may sometimes be desirable to perform some machining in between other processes (i.e., between metal sprays or before densification).

The order of operation, i.e., which side is the first side and which side is the reverse side as described herein, may be selected according to the nature of the component to be produced and manufacturing, machining, surface profile, and surface finish considerations. For example, in the case of an airfoil, it may be desirable to perform the operation on the suction or convex side first followed by the pressure or concave side.

The rough structure is not 100% dense and requires a densification process such as hot isostatic pressing (HIP) or other similar process. This densification process may be done with the core(s) and/or former tool in place or after removal of the core(s) and/or former tool. If necessary, the surfaces of the core(s) and/or former tool may be hermetically sealed by coating core(s) and/or former tool with a base material or other suitable material before spraying, e.g. by electro-plating. Core(s) may be therefore completely surrounded by the applied metal material to form enclosed cavities.

A technical advantage is that the resulting microstructure is very fine grained, and the finished structure may have superior mechanical properties to hollow structures created by other hollow metal fabrication methods, and much superior to cast properties. This method also allows the use of other material technology enhancements associated with the use of powder feedstock/additive manufacturing.

A commercial advantage of this method is that it permits faster processing, reduced tooling requirements, and better material utilization relative to conventional fabrication techniques, all of which may translate to lower costs.

A technical advantage is a thinner and lighter fan blade than conventional solid titanium blades. A commercial advantage is a hollow fan blade or metal leading edge (MLE) that is cheaper to manufacture than conventional ones.

A technical advantage is that a component may be made from a single piece of material, i.e., integrally formed, yet be designed to take advantage of different material properties in different areas of the component. This can result in a weight or thickness reduction of the finished component. Additionally alloys not normally available using melt processes can be used, extending this advantage. A commercial advantage is that parts normally requiring fabrication due to differing material property requirements in different areas may be integrally formed from a single piece. Elimination of the bonding, welding, brazing, and/or bolting operations and a reduction in parts count could result in cost savings.

Metal spray build up onto an existing component is common. A component may be repaired by replacing missing material with a metal spray, then final machining. A local area subject to wear may be coated with a wear resistant material. In these cases the component is conventionally produced then modified by the addition of a different material at a discrete location. In contrast to existing applications of metal spray processes, the proposed method allows the formation of a component in a single operation, such component comprising regions comprised of different materials having relatively different material properties, with gradual transitions between such different regions.

A component produced from the methods described herein may be airfoil shaped and adapted for use as a rotating airfoil, such as a fan blade, or for use as a stationary blade, such as a guide vane. An airfoil fabricated with the methods and materials described herein may have material properties which vary in different locations to suit local requirements. The hollow metal object, such as an airfoil, may be hollow, may be a complete airfoil, or may be a partial airfoil (such as a metal leading edge for bonding to a composite airfoil).

An airfoil may be hollow to have required frequencies but a reduced weight relative to a solid airfoil. For vibratory and impact response, a hollow airfoil may require multiple small cavities rather than a few large ones. Manufacture using a metal-spray-over-core method described above can result in a hollow airfoil with several small cavities that is less costly and has superior material properties than an airfoil produced via traditional methods. The characteristics of an airfoil may be improved by tailoring the local material properties to meet design objectives with lower weight or thickness. For example, fan blades may be produced from the methods described herein. Fan blade impact damage may be reduced by increasing the modulus, yield strength, and density local to the leading edge. This can be achieved, for example, by alloying a denser element such as Tungsten (W) into the leading edge material. This will allow a thinner edge for improved aerodynamic performance. The region around the airfoil and shank has a strong influence on the flexural modal response. Alloying Boron (B) with the titanium in this region, for example, can increase the modulus and strength allowing the same frequency with a thinner blade. The manufacturing methods and multiple properties described are also applicable to embodiments such as the metal leading edge (MLE) used for composite fan blades.

Components that embody this invention may have a very fine grained microstructure with superior mechanical and material properties as compared to conventionally made hollow components. Embodiments of the invention offer commercial advantages and lower costs resulting from faster processing, reduced tooling requirements, and better material utilization relative to conventional techniques and conventionally created hollow components.

A metal spray process is an additive manufacturing process which takes a feedstock, which may comprise metallic powder, accelerates the constituents of the feedstock, and impacts said constituents onto a substrate where they stick. Layers accumulate, eventually resulting in a product comprised of the feedstock. The constituents of the feedstock may be changed such that different regions of the substrate may be formed from different metals and/or metal alloys, ultimately resulting in a product with different material properties in different regions of the product. Densification processes result in an integrally-formed, 100% dense component.

Cores and a backing tool or former may be used to impart one or more hollow areas in a component created from a metal spray process. In one embodiment of the invention, a method utilizes a metal spray process to spray one or more metal powders onto a former and one or more cores to create a partially-formed structure. The former allows metal to build up in the space around the cores. The former is removed, and a second metal spray process is performed on the reverse side, resulting in a rough structure. The cores may be mechanically or chemically removed either after the first metal spray process or after the second metal spray process, or cores made from lighter weight materials may be left in place. The rough structure then undergoes a densification process to result in a hollow component. Another embodiment of the invention is the hollow component created from such a method.

A wide variety of hollow metal structures may be fabricated using the methods and materials described herein. For example, airfoils both rotational and stationary may be fabricated, as well as non-aerodynamic elements such as struts and other stationary structures where the advantages of light weight with metallic materials are desired.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of making a hollow metal component comprising the steps of:
providing a forming tool;
providing at least one core comprising a first side and a reverse side, the reverse side being in contact with the forming tool;
utilizing a first metal spray process to apply at least one metal or metal alloy to said first side of said core, resulting in a partially-formed structure comprising a first side and a reverse side;
removing said forming tool from said partially-formed structure while retaining said core within said partially-formed structure, thereby exposing the respective reverse sides of said partially-formed structure and said core; and
utilizing a second metal spray process to apply at least one metal or metal alloy to the reverse sides of said partially-formed structure and said core, resulting in a rough structure.

2. The method of claim 1, wherein a plurality of cores are provided in spaced relation to one another and at least one metal or metal alloy is applied between said plurality of cores.

3. The method of claim 1, wherein said rough structure is subjected to a densification process.

4. The method of claim 3, wherein the densification process comprises hot isostatic pressing.

5. The method of claim 3, wherein the densification process is performed on internal layers of the partially-formed structure.

6. The method of claim 1 further comprising hermetically sealing said forming tool, said at least one core, or combinations thereof using an electroplating process before utilizing said first metal spray process.

7. The method of claim 1, wherein the at least one core is formed from a lightweight material that is left inside the component.

8. A method of making a hollow metal component comprising the steps of:
   utilizing a first metal spray process to apply at least one first metal or metal alloy to a first side of a core, resulting in a partially-formed structure comprising a first side and a reverse side; and
   utilizing a second metal spray process to apply at least one second metal or metal alloy to the reverse side of the partially-formed structure and a reverse side of the core, wherein the core is formed from a lightweight material that is left inside the component.

9. The method of claim 8, wherein the at least one first metal or metal alloy and the at least one second metal or metal alloy comprises:
   metallic powder particles that are accelerated and impacted onto the core or another substrate where they stick.

10. The method of claim 8, further comprising:
   thermally treating the hollow metal component to melt the at least one first metal or metal alloy and the at least one second metal or metal alloy.

* * * * *